United States Patent
Bill et al.

(10) Patent No.: US 10,696,382 B2
(45) Date of Patent: Jun. 30, 2020

(54) FAULT DETECTION BASED ON BRAKE TORQUE AND TEMPERATURE

(71) Applicant: Airbus Operations Limited, Bristol (GB)

(72) Inventors: Andrew Bill, Bristol (GB); David Clarke, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 338 days.

(21) Appl. No.: 15/879,779

(22) Filed: Jan. 25, 2018

(65) Prior Publication Data
US 2018/0208300 A1    Jul. 26, 2018

(30) Foreign Application Priority Data

Jan. 26, 2017    (GB) .................................. 1701294.9

(51) Int. Cl.
*B64C 25/44*    (2006.01)
*B64F 5/60*    (2017.01)
(Continued)

(52) U.S. Cl.
CPC ............ *B64C 25/44* (2013.01); *B60T 8/1703* (2013.01); *B60T 8/885* (2013.01); *B60T 17/22* (2013.01);
(Continued)

(58) Field of Classification Search
CPC ......... B64C 25/44; B64C 25/42; B60T 8/885; B60T 17/22; B60T 8/1703;
(Continued)

(56) References Cited

U.S. PATENT DOCUMENTS

| 7,086,503 B2 * | 8/2006 | Miller ................... B60T 17/22 188/1.11 L |
| 2003/0102191 A1 | 6/2003 | DeVlieg |
| 2013/0264418 A1 | 10/2013 | Frank |
| 2014/0201571 A1 | 7/2014 | Hosek et al. |

(Continued)

FOREIGN PATENT DOCUMENTS

| EP | 3 115 266 | 1/2017 |
| FR | 2 992 942 | 1/2014 |

(Continued)

*Primary Examiner* — Jonathan M Dager
*Assistant Examiner* — Jean W Charleston
(74) *Attorney, Agent, or Firm* — Nixon & Vanderhye P.C.

(57) ABSTRACT

A fault detection system for an aircraft braking system including: a controller configured to receive braking demand information; torque information; wear information; wheel speed information; and brake temperature information. The controller is to calculate an expected maximum temperature of the brake based on the torque information, the wear information and the wheel speed information; to determine whether a significant temperature discrepancy exists between the expected maximum temperature and the brake temperature information; to determine whether a significant torque-related discrepancy exists based on the braking demand information and the torque information. The controller is to generate a first alert if a significant torque-related discrepancy exists and no significant temperature discrepancy exists; a second alert if a significant temperature discrepancy exists and no significant torque-related discrepancy exists; and a third alert if a significant temperature discrepancy and a significant torque-related discrepancy exists.

21 Claims, 5 Drawing Sheets

(51) Int. Cl.
*B60T 8/17* (2006.01)
*B60T 17/22* (2006.01)
*B60T 8/88* (2006.01)
*G07C 5/00* (2006.01)
*G07C 5/08* (2006.01)
*B64D 45/00* (2006.01)

(52) U.S. Cl.
CPC ............ *B64F 5/60* (2017.01); *B60T 2270/406* (2013.01); *B64D 2045/0085* (2013.01); *G07C 5/006* (2013.01); *G07C 5/0808* (2013.01); *G07C 5/0816* (2013.01)

(58) Field of Classification Search
CPC .... B60T 2270/406; B60T 17/221; B64F 5/60; G07C 5/0816; G07C 5/0808; G07C 5/006; B64D 2045/0085
USPC ......................................................... 701/29.1
See application file for complete search history.

(56) References Cited

U.S. PATENT DOCUMENTS

| | | | |
|---|---|---|---|
| 2014/0269824 A1* | 9/2014 | Miller | G01K 3/04 374/104 |
| 2015/0025735 A1* | 1/2015 | Mylaraswamy | B60T 17/221 701/31.9 |
| 2015/0145703 A1* | 5/2015 | Martin | B60T 17/221 340/960 |
| 2016/0052642 A1 | 2/2016 | Gordon et al. | |
| 2016/0263374 A1* | 9/2016 | Li | A61N 1/16 |
| 2017/0106995 A1* | 4/2017 | Burte | B60T 17/221 |

FOREIGN PATENT DOCUMENTS

| | | | | |
|---|---|---|---|---|
| GB | 2 423 342 | | 8/2006 | |
| GB | 2423342 A | * | 8/2006 | ............. B60T 17/22 |
| GB | 2 540 180 | | 1/2017 | |
| WO | 02/12043 | | 2/2002 | |
| WO | WO-0212043 A1 | * | 2/2002 | ............. F16D 66/02 |

* cited by examiner

FAULT DETECTION BASED ON BRAKE TORQUE AND TEMPERATURE

RELATED APPLICATION

This application claims priority to United Kingdom (GB) Application 1701294.9 filed Jan. 26, 2017, the entirety of which is incorporated.

TECHNICAL FIELD

The present invention relates to a fault detection system to detect faults relating to an aircraft braking system comprising at least one brake, and a method for detecting and diagnosing faults with an aircraft braking system.

BACKGROUND

Modern aircraft, particularly airliners, have various sensors to monitor the condition and performance of aircraft components including brakes, wheels and tyres. Typically, each monitored parameter (e.g. brake temperature, tyre pressure, wheel speed, etc.) may be measured by a separate sensor, and the sensor data provided to a dedicated monitoring system for that parameter. If a monitored parameter deviates from a normal operating range, the associated monitoring system may generate an alert.

A deviation from normal of a single parameter cannot provide much information about the root cause of the deviation. Therefore, in response to such an alert, a maintenance crew must perform comprehensive investigations in order to identify the location and nature of the fault. Such investigations are time consuming and may cause a significant interruption to the operation of the aircraft. Moreover, in some cases it may turn out that the fault is sufficiently minor that the aircraft can keep operating until its next scheduled maintenance operation, in which case the interruption was unnecessary.

There also exists a trend toward actively controlling various aircraft systems and components, such as braking systems, for example to optimize performance or increase operational lifespan. Such active control may alter the operation of an aircraft system based on feedback from the sensors monitoring the components of that system. Where such active control is operating to alter the behaviour of a given aircraft component, any deviation from normal behaviour of the component may not be detectable based on the sensor data relating to the performance of that component, since the active control system may automatically compensate for the deviation. Various faults could therefore become undetectable by current monitoring systems, as a result of active control being introduced.

An improved system for detecting faults relating to aircraft systems, and in particular aircraft braking systems, is therefore desired.

SUMMARY

A first aspect of the present invention provides a fault detection system to detect faults relating to an aircraft braking system comprising at least one brake. The fault detection system comprises a controller configured to: receive braking demand information relating to a requested braking intensity for a braking event; receive torque information relating to an amount of torque reacted by the at least one brake during the braking event; receive wear information relating to a wear state of the at least one brake during the braking event; receive wheel speed information relating to a wheel speed of a wheel associated with the at least one brake during the braking event; receive brake temperature information relating to a maximum temperature of the at least one brake as a result of the braking event; calculate an expected maximum temperature of the brake as a result of the braking event, based on the received torque information, the received wear information and the received wheel speed information; determine whether a significant temperature discrepancy exists between the calculated expected maximum temperature and the received brake temperature information; and determine whether a significant torque-related discrepancy exists based on the received braking demand information and the received torque information. If a significant torque-related discrepancy exists and no significant temperature discrepancy exists, the controller is configured to generate a first alert relating to a first fault type. If a significant temperature discrepancy exists and no significant torque-related discrepancy exists, the controller is configured to generate a second alert relating to a second fault type. If a significant temperature discrepancy exists and a significant torque-related discrepancy exists, the controller is configured to generate a third alert relating to a third fault type.

Optionally, the first fault type comprises physical faults relating to braking-related components of the braking system, the second fault type comprises monitoring faults relating to monitoring-related components of the braking system, and the third fault type comprises faults relating to a torque sensor which generates the received torque information. Optionally, the first fault type comprises one or more of: residual braking, a ruptured brake disc, a hydraulic failure. Optionally, the second fault type comprises one or more of: failure of one or more sensors, incorrect operation of one or more sensors, inaccurate readings generated by one or more sensors.

Optionally, the controller is configured to determine whether a significant temperature discrepancy exists by determining whether the received temperature information meets at least one predefined temperature discrepancy criterion comprising a predefined primary temperature difference threshold. The controller may, for example, determine whether the received temperature information meets the at least one predefined temperature discrepancy criterion by calculating a temperature difference between the received temperature information and the expected temperature and determining whether the calculated difference exceeds the predefined primary temperature difference threshold.

Optionally, the controller is to calculate a temperature difference in respect of each flight cycle of the aircraft. Optionally the at least one predefined temperature discrepancy criterion comprises a predefined second temperature difference threshold and a predefined number N of consecutive flight cycles, and the controller is to determine whether a significant temperature discrepancy exists by determining whether each of the N most recent calculated temperature difference values exceeds the predefined second temperature difference threshold.

Optionally, the at least one predefined temperature discrepancy criterion is defined based on calibration data for the at least one brake.

Optionally, the controller is configured to update the at least one predefined temperature discrepancy criterion based on historical received braking demand information, torque information, wear information, wheel speed information, and/or brake temperature information relating to the at least one brake.

Optionally, the controller is configured to determine whether a significant torque-related discrepancy exists by calculating a brake gain based on the received torque information, the received braking demand information and the received wheel speed information. Optionally, the controller is to determine whether a significant torque-related discrepancy exists by determining whether the calculated brake gain meets at least one predetermined brake gain discrepancy criterion. Optionally, the at least one predefined brake gain discrepancy criterion comprises a predefined upper primary brake gain threshold and a predefined lower primary brake gain threshold, the controller is configured to determine whether a significant brake gain discrepancy exists by determining whether the calculated brake gain is between the upper primary brake gain threshold and the lower primary brake gain threshold.

Optionally, the controller is configured to calculate a brake gain in respect of each flight cycle of the aircraft. Optionally, the at least one predefined brake gain discrepancy criterion comprises a predefined upper secondary brake gain threshold, a predefined lower secondary brake gain threshold, and a predefined number L of consecutive flight cycles, and the controller is to determine whether a significant torque-related discrepancy exists by determining whether each of the L most recent calculated brake gain values is between the upper secondary brake gain threshold and the lower secondary brake gain threshold.

Optionally, the received torque information relates to a torque reacted by the at least one brake over a complete flight cycle; the received braking demand information relates to requested braking intensity over the complete flight cycle; and the calculated brake gain is an average brake gain for the complete flight cycle.

Optionally, the at least one predefined brake gain discrepancy criterion is defined based on calibration data for the at least one brake.

Optionally, the controller is to update the at least one predefined brake gain discrepancy criterion based on historical received braking demand information, torque information, and/or wheel speed information relating to the at least one brake.

Optionally, the controller is further configured to detect residual braking by: calculating an expected torque expected to be reacted by the brake during the braking event based on the received braking demand information; determining an actual torque reacted by the brake during the braking event based on the received torque information; and determining whether the determined actual torque is significantly higher than the calculated expected torque.

Optionally, the received braking demand information comprises information relating to braking intensity currently being requested for a braking event; the received torque information comprises information relating to a torque currently being reacted by the at least one brake; and the received wheel speed information comprises information relating to a current wheel speed of the at least one brake. Optionally the controller is configured to continuously detect residual braking by calculating in real-time a current expected torque expected to be being currently reacted by the brake; determining in real-time a current actual torque reacted by the brake during the braking event, and determining in real-time whether the determined current actual torque is significantly higher than the calculated current expected torque. Optionally the controller is configured to detect residual braking in response to a determination that a significant torque-related discrepancy exists.

Optionally, the controller is configured to determine the expected brake temperature by: determining an amount of energy input to the brake during the braking event, based on the received torque information and the received wheel speed information; and determining a thermal mass of a component of the brake, based on the received wear information.

Optionally, the received temperature information relates to a temperature of the at least one brake at the end of a particular flight cycle. Optionally, the controller is configured to calculate an expected temperature of the at least one brake at the end of the particular flight cycle and is configured to determine whether a significant discrepancy exists between the calculated expected temperature and the received temperature information in respect of the particular flight cycle.

Optionally, the first alert comprises a warning message indicating a fault of the first type, the second alert comprises a warning message indicating a fault of the second type, and the third alert comprises a warning message indicating a fault of the third type.

A second aspect of the present invention provides an aircraft comprising: a torque sensor for measuring the torque reacted by a brake during a braking event; a wear sensor for measuring a wear state of the brake; a temperature sensor for measuring a temperature of the brake; a wheel speed sensor for measuring a wheel speed of a wheel braked by the brake; and a fault detection system according to the first aspect.

A third aspect of the present invention provides a method for detecting and diagnosing faults with an aircraft braking system comprising a brake. The method comprises: measuring an actual maximum temperature of the brake at the end of a flight cycle; measuring an actual torque reacted by the brake during the flight cycle; determining a requested braking force to be applied by the brake during the flight cycle; calculating an expected maximum temperature of the brake at the end of the flight cycle, based on a measured wear state of the brake during the flight cycle, measured wheel speed of a wheel associated with the brake during the flight cycle, and the actual torque reacted by the brake during the flight cycle; determining whether a significant torque-related discrepancy exists based on the actual torque and the requested braking force; determining whether a significant temperature discrepancy exists between the expected maximum temperature and the actual maximum temperature; if a significant torque-related discrepancy exists and no significant temperature discrepancy exists, predicting the existence of a first type of fault; if a significant temperature discrepancy exists and no significant torque-related discrepancy exists, predicting the existence of a second type of fault; and if a significant temperature discrepancy exists and a significant torque-related discrepancy exists, predicting the existence of a third type of fault.

BRIEF DESCRIPTION OF THE DRAWINGS

Embodiments of the invention will now be described, by way of example only, with reference to the accompanying drawings, in which.

DETAILED DESCRIPTION

Many aircraft, and in particular aircraft of airlines, are equipped with one or more monitoring systems for monitoring the condition and/or performance of an aircraft component. An example of such a monitoring system is a brake temperature monitoring system (BTMS) for measuring and monitoring the temperatures of the wheel brakes. A BTMS comprises a temperature sensor for each wheel brake of each of the sets of wheels which may be braked. Each of the temperature sensors is in communication with a central computer, which is usually located in the avionics bay of the aircraft. The BTMS computer monitors the measured brake temperatures and can generate an alert in certain situations, for example if a brake is too hot for the aircraft to take off. Similarly, a tyre pressure monitoring system may comprise a pressure sensor for each tyre, which provide data to a central computer. Other monitoring systems, such as brake wear pins, rely on visual inspection of the sensor or measuring device by ground crew. Although current monitoring systems provide vital information to the flight crew, including alerts for when preset thresholds have been breached (e.g. for brake temperatures or tyre pressures), these systems are not able to diagnose the underlying root cause of a detected discrepancy. Moreover, there are several types of current and potential faults which current monitoring systems are not able to detect.

The examples described herein seek to mitigate or avoid these shortcomings of current systems. The examples achieve this by processing together data from a plurality of different sensors. In particular, the fault detection systems of this disclosure use first measurement data to predict expected values for second measurement data. Comparing the expected values to the actual measured values in respect of each of a plurality of types of second measurement data can enable a significantly broader range of faults to be detected than is possible with current individual monitoring systems, and can even provide information about the location and/or nature of a detected fault. This can allow maintenance crews to locate a detected fault quickly, thus reducing interruptions to aircraft operation. In some cases, it may even be possible to determine that a fault is sufficiently minor to permit continued operation of the aircraft until its next scheduled maintenance, without any manual investigations by maintenance personnel.

Figure 1:
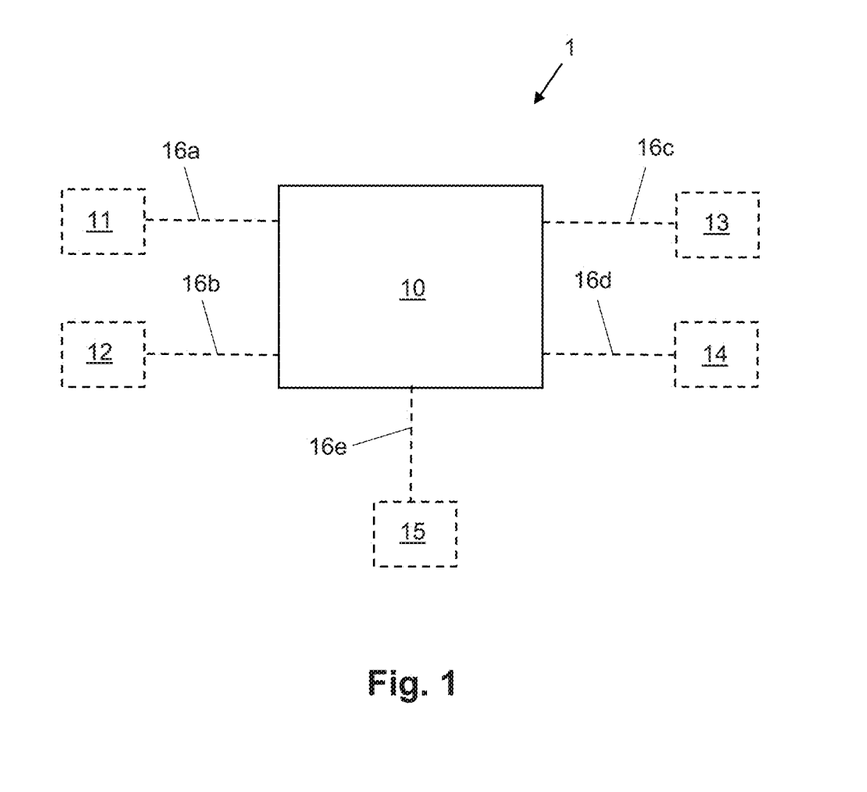
FIG. 1 shows a schematic view of a fault detection system according to an example.

FIG. 1 shows an example fault detection system 1. The fault detection system 1 is to detect faults relating to an aircraft braking system (not shown) comprising at least one brake. A braking system of a commercial airliner may typically comprise, for example, a brake pack for each wheel, each brake pack comprising multiple rotors and stators, a brake control (such as a brake pedal) operable by a pilot to demand an amount of braking, and a braking controller to activate one or more of the brake packs in response to a braking demand received via the brake control. It is envisaged that the fault detection system 1 will generally be used to detect faults with a braking system of this form and the following description is written in the context of such a braking system. However; example fault detection systems according to the invention may also be used with other types of braking system, which may have more or fewer components than a typical airliner braking system.

The fault detection system 1 comprises a controller 10, which is configured to receive various inputs. In particular, the controller 10 is configured to receive braking demand information relating to a requested braking intensity for a braking event, torque information relating to an amount of torque reacted by the at least one brake during the braking event; wear information relating to a wear state of the at least one brake during the braking event, wheel speed information relating to a wheel speed of a wheel associated with the at least one brake during the braking event, and brake temperature information relating to a temperature of the at least one brake after the braking event. The components from which the braking demand information, torque information, wear information, wheel speed information and brake temperature information are received are not comprised in the fault detection system 1, and are therefore shown on FIG. 1 using dashed lines.

In the context of the current disclosure, the term "braking event" is used to refer to any operation of the brake which causes energy to be input to the brake and therefore the temperature of the brake to increase. The operation of the brake will typically be, e.g., for the purpose of slowing an aircraft on which it is installed. A braking event will typically occur during landing and/or taxiing of the aircraft. In the current disclosure, the term "braking event" may be used to refer to a single operation of the brake, or to multiple consecutive operations of the brake. However; for multiple operations of the brake to be considered as comprised in a single braking event, the intervening time period between consecutive operations of the brake should be short enough that the brake has not cooled by any significant amount in that intervening time period. Multiple braking events may typically occur during a single flight cycle. In the current disclosure, the term "flight cycle" is intended to refer to one take-off and subsequent landing of an aircraft, including taxiing before the take-off and after the landing.

The controller 10 is further configured to calculate an expected temperature of the brake as a result of the braking event, based on the received torque information, the received wear information and the received wheel speed information, and to determine whether a significant temperature discrepancy exists between the calculated expected temperature and the received brake temperature information. The controller 10 is further configured to determine whether a significant torque-related discrepancy exists based on the received braking demand information and the received torque information.

The controller 10 can detect and classify various possible braking system faults based on whether one, both or neither of a significant torque-related discrepancy and a significant temperature discrepancy exists. If a significant torque-related discrepancy exists and no significant temperature discrepancy exists, the controller 10 is configured to generate a first alert relating to a first fault type. If a significant temperature discrepancy exists and no significant torque-related discrepancy exists, the controller 10 is configured generate a second alert relating to a second fault type. If a significant temperature discrepancy exists and a significant torque-related discrepancy exists, the controller 10 is configured to generate a third alert relating to a third fault type. If neither a significant torque-related discrepancy nor a significant temperature discrepancy exists, the controller 10 may be configured to determine that no fault exists at the current time. In this situation, in at least some examples, no alerts are generated.

In some examples the first fault type comprises physical faults relating to braking-related components of the braking system. Physical faults include, for example, residual braking, a ruptured brake disc, a hydraulic failure, or the like. In some examples the second fault type comprises monitoring faults relating to monitoring-related components of the braking system. Monitoring faults include, for example, failure of one or more sensors, incorrect operation of one or more sensors, inaccurate readings generated by one or more sensors, or the like. In some examples the third fault type comprises faults relating to a torque sensor which generates the received torque information.

In some examples the controller 10 may additionally be configured to interact with built-in test equipment (BITE) of an aircraft on which the fault detection system is installed, in order to diagnose a detected fault.

The first, second and third alerts generated by the controller 10 may comprise warning messages of any suitable type. For example, the first alert may comprise a warning message indicating a fault of the first type, the second alert may comprise a warning message indicating a fault of the second type, and the third alert may comprise a warning message indicating a fault of the third type. An alert generated by the controller 10 may comprise a control signal configured to cause a display device (e.g. a display device located in the cockpit of the aircraft, or a display device of a portable maintenance device used by ground crew) to display a warning message. An alert generated by the controller may comprise information relating to fault type. An alert generated by the controller may comprise ancillary information relating to a fault, such as a time the fault was detected, a severity of the fault, a location of the fault, or the like.

The braking demand information may be received by the controller 10 from the aircraft braking system, for example from a braking controller 11 of the aircraft braking system. The controller 10 may be connected by a communications link 16a to the braking controller 11. The communications link 16a may be wired, wireless, or part wired and part wireless. For example, the communications link 16a may comprise an electronic signal, or a databus. The communications link 16a may be direct or indirect (an indirect communications link may involve, for example, an avionics system of the aircraft). The braking demand information may be received by the controller 10 in the form of an electrical signal. The braking demand information may be generated, for example, when a pilot of the aircraft activates a control to initiate braking. For example, braking demand information may be generated when the pilot presses a brake pedal. The control may be configured such that the pilot can vary the intensity of the braking being demanded. In examples in which the control comprises a brake pedal, for example, the demanded braking intensity may correlate with the amount of pressure applied by the pilot to the brake pedal. The braking demand information may therefore comprise information relating to a demanded braking intensity.

For the purposes of this disclosure, "braking intensity" is used to refer to an overall amount of braking to be achieved (i.e. in response to a braking demand). It will be appreciated that this may not correlate with the "intensity" (i.e. forcefulness) with which any given brake of the aircraft is applied to achieve the braking. For example, a braking demand having an associated demanded braking intensity can be considered to be demanding a particular amount of braking, and in a multi-brake vehicle, that demanded amount of braking can potentially be achieved by applying one of the brakes very forcefully, or by applying all of the brakes much less forcefully. How much braking intensity is being demanded by a pilot (or an auto-brake function) can be determined by the braking controller 11 in any suitable manner, and can be encoded into command signals to activate the aircraft brakes in any suitable manner. Therefore, in some examples the braking demand information may comprise information relating to the manner in which the particular brake of the braking system is applied during the braking event. In some examples the braking demand information may comprise, or may be based on, one or more command signals sent from the braking controller 11 to the brake.

In some examples the aircraft may be configured such that a braking demand comprises a continuous signal over a period of time, which may be a time period during which braking is to be performed. For example, a pilot may maintain a brake pedal in a depressed state for the whole time period during which they wish the brakes to be applied. During the time period, the intensity of the braking being demanded may vary, as indicated by the pilot varying the pressure being applied to a brake pedal. The braking demand information may therefore comprise a time-varying signal.

The torque information may be received by the controller 10 from a torque sensor 12, via a communications link 16b. The communications link 16b may have any of the features of the communications link 16a described above. The torque information may be received by the controller 10 in the form of an electrical signal, which may be received wirelessly or via a databus. The torque information may comprise measurement data generated by the torque sensor 12.

The torque sensor 12 is configured to measure the torque reacted by the brake and output measured torque values. In some examples the torque sensor 12 is configured to transmit measured torque values to the controller 10. In some examples the torque sensor 12 is configured to transmit a series of torque values during the course of a braking event. In some examples the torque sensor 12 is configured to transmit a series of torque values during the course of a flight cycle. In other examples the torque sensor 12 is configured to measure (or calculate) a total torque reacted by a brake during a braking event or during a flight cycle and to output a total torque value for that braking event or flight cycle. The torque sensor 12 can be of any suitable design. For example, on an aircraft having a classic bogie arrangement, the torque sensor 12 can comprise a Torque Pin of strain gauge type, located on a brake torque rod. On an aircraft without a bogie, it is proposed to use an optical load sensor to measure torque on an axle to which the brake is mounted. Any other suitable type of torque sensor could be used.

The wear information may be received by the controller 10 from a wear sensor 13, via a communications link 16c. The communications link 16c may have any of the features of the communications link 16a described above. The wear information may be received by the controller 10 in the form of an electrical signal, which may be received wirelessly or via a databus. The wear information may comprise measurement data generated by the wear sensor 13.

The wear sensor 13 is configured to measure a wear state of the brake. For example, in a multi-disc aircraft brake pack, material is removed from the discs (due to frictional forces between the stators and rotors) during operation of the brake. Over the life time of a brake pack, a sufficient amount of material will be removed from the discs to have a non-negligible effect on the mass of the brake. This is particularly true in the case of carbon brake discs. The wear sensor 13 is configured to measure a parameter relating to the wear of the brake in such a way that the measurements of the parameter can be used to determine a current mass of the brake. In some examples the wear sensor 13 is configured to measure the thickness of one or more brake discs comprised in the brake, and to output a thickness value for the one or more brake discs. In some examples the wear sensor 13 is configured to transmit a thickness value for the one or more brake discs to the controller 10. It will be appreciated that, provided that the geometry and material properties of the brake disc are known, such a thickness value can enable the calculation of the mass of the one or more brake discs. In some examples, the thickness of all of the brake discs comprised in a brake pack is measured as a whole.

The wear sensor 13 can be of any suitable design. For example, in the case of a classic hydraulic aircraft brake, the wear sensor 13 can comprise a linear variable differential transformer (LVDT) sensor, or a Hall Effect sensor, configured to measuring the linear displacement (wear) of a component of the brake. Such a linear displacement sensor can be located, for example, on the rear of the brake piston housing. In the case of an electric brake comprising an e-brake controller, the brake wear is measured as part of the e-brake controller. This information can be made available to the controller 10. In such examples the wear sensor 13 comprises an e-brake controller of the brake (i.e. the brake for which wear information is being provided).

The wheel speed information may be received by the controller 10 from a wheel speed sensor 14, via a communications link 16*d*. The communications link 16*d* may have any of the features of the communications link 16*a* described above. The wheel speed information may be received by the controller 10 in the form of an electrical signal, which may be received wirelessly or via a databus. The wheel speed information may comprise measurement data generated by the wheel speed sensor 14.

The wheel speed sensor 14 is configured to measure the wheel speed of a wheel associated with the brake (i.e. a wheel braked by the brake) and output measured wheel speed values. In some examples the wheel speed sensor 14 is configured to transmit measured wheel speed values to the controller 10. In some examples the wheel speed sensor 14 is configured to transmit a series of wheel speed values during the course of a braking event. In some examples the wheel speed sensor 14 is configured to transmit a series of wheel speed values during the course of a flight cycle. The wheel speed sensor 14 can be of any suitable design.

The brake temperature information may be received by the controller 10 from a brake temperature sensor 15, via a communications link 16*e*. The communications link 16*e* may have any of the features of the communications link 16*a* described above. The brake temperature information may be received by the controller 10 in the form of an electrical signal, which may be received wirelessly or via a databus. The brake temperature information may comprise measurement data generated by the brake temperature sensor 15.

The brake temperature sensor 15 is configured to measure the temperature of the brake and output measured brake temperature values. In some examples the brake temperature sensor is configured to transmit measured brake temperature values to the controller 10. In some examples the brake temperature sensor 15 is a temperature sensor associated with a BTMS of the aircraft. The brake temperature sensor 15 is located on or in the brake pack, and is arranged to obtain a measurement of the internal temperature of the brake pack. In some examples the brake temperature sensor 15 comprises a thermocouple. The brake temperature sensor 15 can be arranged to transmit a measured temperature value directly to the controller 10. Alternatively, the brake temperature sensor 15 can be arranged to transmit a measured temperature value to a BTMS controller, which in turn transmits the measured temperature value to the controller 10.

In some examples the controller 10 is configured to calculate the expected brake temperature by determining an amount of energy input to the brake during the braking event based on the received torque information and the received wheel speed information, and determining a thermal mass of a component of the brake based on the received wear information. The controller may be further configured to calculate an expected temperature increase of the brake as a result of the braking event, based on a determined thermal mass of a brake component and a determined amount of energy input to the brake during the braking event. In some examples the controller 10 is configured to calculate the expected brake temperature by adding the expected temperature increase to a known (e.g. from historical received brake temperature information) or estimated temperature of the brake immediately before the braking event.

The rate of energy input to the brake (that is, the braking power) during a braking event can be calculated by multiplying the torque at a given instant by the wheel speed at that instant. Integrating the power over the duration of the braking event yields the total amount of energy input to the brake during the braking event. The controller 10 can therefore determine the energy input based on received torque information and received wheel speed information which covers the duration of a braking event.

The controller may be configured to determine a thermal mass of a component of the brake by determining a mass of that component of the brake, based on the received wear information. The mass of the brake component depends on the amount and type of material comprised in the brake component. As discussed above, brake discs can experience a significant reduction in the amount of material they comprise, over the lifetime of the brake, and thus a significant change in their mass. Brake discs are expected to wear evenly, such that the controller 10 can be programmed with appropriate information about a brake disc (e.g., geometry, material type, material properties) such that the controller 10 can determine the mass of the brake disc based on a received wear measurement. The information about the brake disc may be stored in a memory accessible by the controller 10. The controller 10 can then determine the thermal mass of the brake based on the determined mass and the specific heat capacity of the brake. A value for the specific heat capacity of the brake may be stored in a memory accessible by the controller 10.

In some examples the controller 10 is configured to calculate the expected torque based on a known or expected relationship between the received braking demand information and the received torque information (e.g. an expected relationship between a particular type of braking demand data comprised in the received braking demand information and torque reacted by the brake during the brake application resulting from the braking demand to which the information relates). In an example in which the braking demand information comprises a control signal sent from the braking controller 11 to the brake to activate the brake, the control signal may specify a force with which the brake should be applied at a given time. For a hydraulic brake, the braking pressure may be specified. For an e-brake, the clamping force may be specified. If the braking system is operating correctly, the torque reacted by the brake at the given time should be proportional to the specified applied force. The relationship between the applied force and torque developed is known as the brake gain. The instantaneous brake gain may vary with wheelspeed and brake temperature, so in some examples the controller 10 is configured to determine a single value for brake gain in respect of a given braking event, using data from the complete braking event. One way in which the brake gain can be defined (or determined) is using the following equation relating derived brake gain, torque and brake pressure (or clamping force, for an electric brake):

$$G = \frac{\sum (T_B \cdot \omega)}{\sum (P_B \cdot \omega)} \quad \text{(Equation 1)}$$

where G is the brake gain, $T_B$ is the torque reacted by the brake, $P_B$ is the brake pressure and $\omega$ is the wheel speed. The brake gain of a particular brake should not vary significantly over the operational lifetime of that brake, assuming that no issues other than normal wear are experienced by the brake. An expected torque can therefore be calculated by multiplying the specified braking force by the brake gain.

In some examples the controller 10 is configured to determine whether a significant temperature discrepancy exists by calculating a temperature difference between the received temperature information and the expected temperature. The controller may be configured to calculate a temperature difference in respect of each flight cycle of the aircraft. In some examples the controller 10 may be configured to calculate a temperature difference in respect of each braking event of the aircraft. However, there is typically a time delay between energy being input to a brake and the brake reaching its maximum temperature as a result of that energy input. As such, the controller 10 may be configured to calculate a temperature difference when a certain period of time has elapsed since the braking event. The period of time may depend, in some examples, on whether or not brake cooling fans are used, and/or on ambient environmental conditions (since these factors will affect how the brake cools). In some examples the controller 10 may be configured to calculate a temperature difference in respect of each flight cycle of the aircraft. In some examples the controller 10 may be configured to detect when a peak temperature has passed (e.g. by detecting that the measured brake temperature values are decreasing) and to calculate a temperature difference when a peak temperature has passed.

Figure 2A:
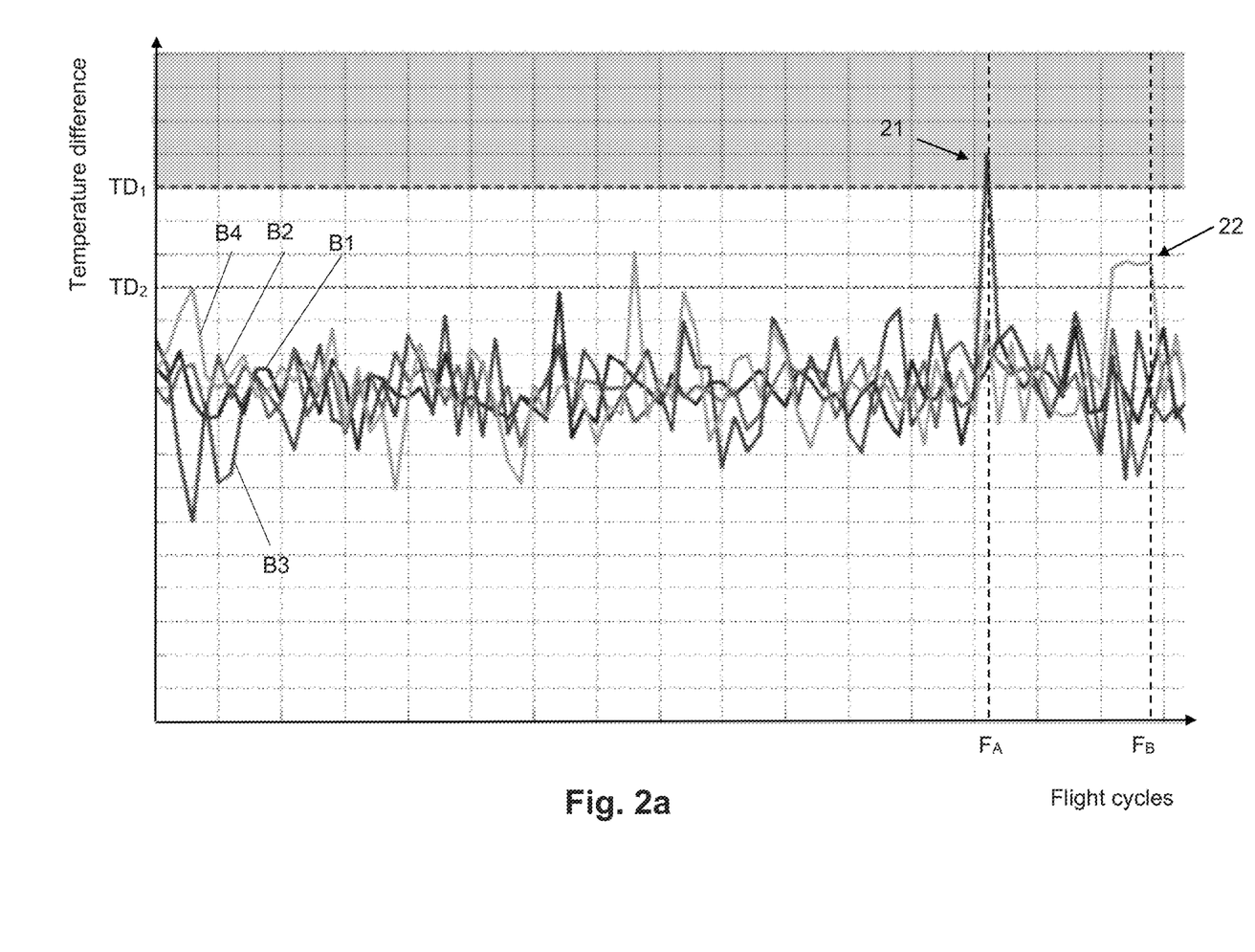
FIG. 2a shows example brake temperature difference data.

FIG. 2a is a plot of calculated temperature differences for a plurality of consecutive flight cycles of an example aircraft comprising a fault detection system according to the invention (e.g. the example fault detection system 1). The temperature difference data relates to four different brakes of the aircraft, B1-B4. One temperature difference value is plotted for each brake, for each flight cycle.

In some examples the controller 10 is configured to determine whether a significant temperature discrepancy exists by determining whether the received temperature information meets at least one predefined temperature discrepancy criterion. Such a predefined temperature discrepancy criterion may, for example, comprise one or more predefined temperature difference thresholds. In such examples the controller 10 may be configured to determine whether a calculated temperature difference exceeds a predefined temperature difference threshold. A predefined temperature difference threshold may be a primary threshold defined such that a calculated temperature difference which exceeds the primary threshold meets the at least one predefined temperature discrepancy criterion. Such a primary threshold may be set, for example, at a level appropriate for ensuring (at least with a high probability) that a single temperature difference greater than the primary threshold is/was caused by a fault with the braking system.

A predefined temperature difference threshold may be a secondary threshold defined such that a calculated temperature difference which is the latest calculated temperature difference in a series of consecutive calculated temperature differences which all exceed the secondary threshold meets the at least one predefined temperature discrepancy criterion. Such a secondary threshold may be set at a lower level than a primary threshold. Such a secondary threshold may be set, for example, at a level appropriate for ensuring (at least with a high probability) that a series of temperature differences greater than the secondary threshold is caused by a fault with the braking system. A predefined temperature discrepancy criterion may comprise a predefined number N of consecutive flight cycles and a secondary threshold, and may be defined such that the latest calculated temperature difference in a series of N consecutive calculated temperature differences which all exceed the secondary threshold meets the at least one predefined temperature discrepancy criterion.

FIG. 2a illustrates an example predefined temperature discrepancy criterion comprising a primary threshold $TD_1$, a secondary threshold $TD_2$, and a predefined number N of consecutive flight cycles (which in the particular example is 3). The example predefined temperature discrepancy criterion of FIG. 2a is defined such that an individual temperature difference value which exceeds $TD_1$ meets the criterion, as does the latest temperature difference in a series of (at least) 3 consecutive temperature differences which all exceed $TD_2$. The example data shows that brake B3 meets the predefined temperature discrepancy criterion by virtue of exceeding $TD_1$ during a single flight cycle (as shown by the sharp peak 21 in the B3 signal). The example data also shows that brake B4 meets the predefined temperature discrepancy criterion by virtue of exceeding $TD_2$ for 3 consecutive flight cycles (as shown by the broad peak 22 in the B4 signal). Therefore, in this example a controller of the fault detection system would determine a significant temperature discrepancy to exist in respect of brake B3 after the flight cycle $F_A$, and would determine a significant temperature discrepancy to exist in respect of brake B4 after the flight cycle $F_B$ (which is the third of a series of three consecutive flight cycles exceeding $TD_2$).

In some examples the at least one predefined temperature discrepancy criterion may be defined based on information relating to the nature of the brake. A predefined temperature discrepancy criterion may be defined in respect of a particular class of brakes in which the brake is comprised, in which case the same predefined temperature discrepancy criterion may be used by the controller 10 in respect of all brakes of the aircraft braking system which are in the particular class. A class of brakes may be defined based on one or more of: brake type, aircraft on which the brake is for use, brake location, brake manufacturer, etc.

In some examples the at least one predefined temperature discrepancy criterion is defined based on information specific to the at least one brake. For example, the at least one predefined temperature discrepancy criterion may be based on calibration data for the at least one brake. In such examples the at least one predefined temperature discrepancy criterion used by the controller 10 may be different between any two brakes of the aircraft. In particular, the level of any thresholds comprised in the at least one predefined temperature discrepancy criterion may be set based on information specific to the at least one brake.

In some examples the controller is configured to update the at least one predefined temperature discrepancy criterion based on historical received braking demand information, torque information, wear information, wheel speed information, and/or brake temperature information relating to the at least one brake. For example, the controller 10 may apply machine-learning techniques to learn the range of normal deviation of the calculated temperature difference for the brake, and may set or adjust the level of one or more thresholds comprised in the at least one predefined temperature discrepancy criterion in accordance with this range of normal deviation. Such updating may additionally be based on information input by maintenance crew, for example information about the existence and/or nature of a fault predicted by the fault detection system 1, and/or about the existence and nature of other faults which may not have been predicted by the fault detection system such as a tyre burst, loss of or deactivation of the brake, known brake faults, or the like. This can ensure that fault information is not duplicated.

In some examples the controller 10 may be configured to determine whether a significant torque-related discrepancy exists by calculating a brake gain (e.g. using Equation 1) based on the received torque information, the received braking demand information and the received wheel speed information. As discussed above, brake gain is expected to be substantially constant over the operational lifetime of a given brake. Brake gain may vary over the course of a flight cycle, but when the braking system is operating correctly this variation is consistent for each flight cycle. Therefore, the average brake gain over a flight cycle (as is given by Equation 1) should be substantially the same for each flight cycle when the braking system is operating correctly. Any deviation of the average brake gain over a flight cycle for a given brake from an expected value (or range of values) for that brake is therefore expected to be indicative of a fault with the braking system. An excessively high brake gain suggests that a brake is being applied when not commanded, and an excessively low brake gain suggests that too little torque is being developed.

Figure 2B:
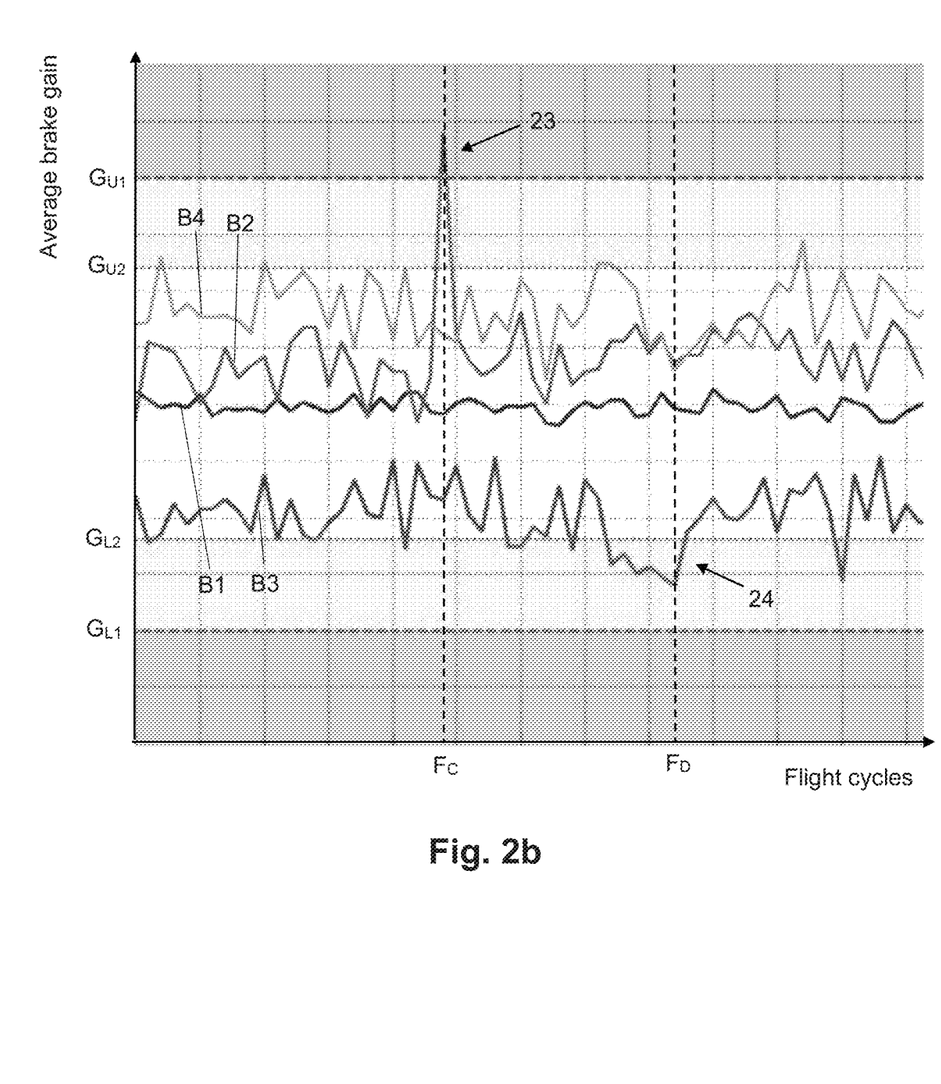
FIG. 2b shows example brake gain data.

FIG. 2b is a plot of average brake gain values for a plurality of consecutive flight cycles of an example aircraft comprising a fault detection system according to the invention (e.g. the example fault detection system 1). The brake gain data relates to four different brakes of the aircraft, B1-B4. One average brake gain value is plotted for each brake, for each flight cycle.

In some examples the controller 10 is configured to determine whether a significant torque-related discrepancy exists by determining whether a calculated brake gain meets at least one predefined brake gain discrepancy criterion. Such a predefined brake gain discrepancy criterion may, for example, comprise one or more predefined brake gain thresholds. In such examples the controller 10 may be configured to determine whether a calculated brake gain exceeds a predefined brake gain threshold. A predefined brake gain discrepancy criterion may comprise an upper brake gain threshold and a lower brake gain threshold, and in such examples the controller 10 may be configured to determine whether a calculated brake gain is between the upper brake gain threshold and the lower brake gain threshold. A predefined brake gain threshold may be a primary threshold defined such that a calculated brake gain which exceeds the primary threshold meets the at least one predefined brake gain discrepancy criterion. A predefined brake gain threshold may be an upper primary threshold defined such that a calculated brake gain which is greater the primary threshold meets the at least one predefined brake gain discrepancy criterion. A predefined brake gain threshold may be a lower primary threshold defined such that a calculated brake gain which is less than the primary threshold meets the at least one predefined brake gain discrepancy criterion. Such primary thresholds may be set, for example, at levels appropriate for ensuring (at least with a high probability) that a single brake gain value greater than the upper primary threshold or less than the lower primary threshold is caused by a fault with the braking system.

A predefined brake gain threshold may be an upper secondary threshold or a lower secondary threshold. The secondary thresholds may be defined such that a calculated brake gain which is the latest calculated brake gain in a series of consecutive calculated brake gains which are either all greater than the upper secondary threshold, or all less than the lower secondary threshold, meets the at least one predefined brake gain discrepancy criterion. An upper secondary threshold may be set at a lower level than an upper primary threshold, and a lower secondary threshold may be set at a higher level than a lower primary threshold. The secondary thresholds may be set, for example, at a level appropriate for ensuring (at least with a high probability) that a series of brake gains greater than the upper secondary threshold or less than the lower secondary threshold is caused by a fault with the braking system. A predefined brake gain discrepancy criterion may comprise a predefined number L of consecutive flight cycles, an upper secondary threshold, and a lower secondary threshold, and may be defined such that the latest calculated brake gain in a series of L consecutive calculated brake gains which are either all greater than the upper secondary threshold or all less than the lower secondary threshold meets the at least one predefined brake gain discrepancy criterion.

FIG. 2b illustrates an example predefined brake gain discrepancy criterion comprising an upper primary threshold $G_{U1}$, a lower primary threshold $G_{L1}$, an upper secondary threshold $G_{U2}$, a lower secondary threshold $G_{L2}$, and a predefined number L of consecutive flight cycles (which in the particular example is 3). The example predefined brake gain discrepancy criterion of FIG. 2b is defined such that an individual brake gain value which is greater than $G_{U1}$ or is less than $G_{L1}$ meets the criterion, as does the latest brake gain value in a series of (at least) 3 consecutive temperature differences which are either all greater than $G_{U2}$ or all less than $G_{L2}$. The example data shows that brake B2 meets the predefined brake gain discrepancy criterion by virtue of exceeding $G_{U1}$ during a single flight cycle (as shown by the sharp peak 23 in the B2 signal). The example data also shows that brake B3 meets the predefined brake gain discrepancy criterion by virtue of exceeding $G_{L2}$ for 3 consecutive flight cycles (as shown by the broad peak 24 in the B3 signal). Therefore, in this example a controller of the fault detection system would determine a significant torque-related discrepancy to exist in respect of brake B2 after the flight cycle $F_C$, and would determine a significant torque-related discrepancy to exist in respect of brake B3 after the flight cycle $F_D$ (which is the third of a series of three consecutive flight cycles exceeding $G_{L2}$).

As with the at least one predefined temperature discrepancy criterion and the at least one predefined torque discrepancy criterion, the at least one predefined brake gain discrepancy criterion may be defined based on information relating to the nature of the brake, and may be defined in respect of a class of brakes or may be specific to each individual brake of the aircraft. The at least one predefined brake gain discrepancy criterion may be defined in an equivalent manner to how the at least one predefined temperature discrepancy criterion is defined.

In some examples the controller 10 is further configured to detect residual braking by calculating an expected torque expected to be reacted by the brake during the braking event based on the received braking demand information, determining an actual torque reacted by the brake during the braking event based on the received torque information, and determining whether the determined actual torque is significantly higher than the calculated expected torque. For the purposes of this disclosure, "detecting residual braking" is intended to refer to performing a process of checking whether residual braking has occurred or is occurring. Thus "detecting residual braking" may result in a positive detection, if residual braking is occurring or has occurred, or a negative detection, if no residual braking is occurring/has occurred. The phrase "detecting residual braking" should not, therefore, be assumed to imply a positive detection.

In some examples the controller 10 is configured to determine that residual braking exists if it is determined that the actual torque is significantly higher than the expected torque. In some examples the controller 10 is configured to determine whether the determined actual torque is significantly higher than the calculated expected torque by calculating a torque difference between the determined actual torque and the calculated expected torque, and determining whether the calculated torque difference meets at least one predetermined residual braking criterion. Such a calculation may be performed based on measured values of the torque reacted by the brake during the braking event. Additionally or alternatively, such a calculation may be performed based on measured values of the torque reacted by the brake during a part of the flight cycle other than during a braking event. For example, residual braking may occur when no braking is being requested, in which case the expected torque would be zero.

The at least one predetermined residual braking criterion may be defined such that if the actual torque is less than or equal to the expected torque, the calculated torque difference does not meet the predetermined residual braking criterion and such that if the actual torque is greater than the expected torque, the calculated torque difference meets the at least one predetermined residual braking criterion. The predetermined residual braking criterion may comprise a difference threshold, in which case it may be defined such that a calculated torque difference smaller than the difference threshold does not meet the at least one predetermined residual braking criterion and such that a calculated torque difference greater than the difference threshold does meets the at least one predetermined residual braking criterion. The level of such a threshold may be set in a similar or equivalent manner to how the temperature-related thresholds discussed above are set.

As with the at least one predefined temperature discrepancy criterion, the at least one predefined residual braking criterion may be defined based on information relating to the nature of the brake, and may be defined in respect of a class of brakes or may be specific to each individual brake of the aircraft. The at least one predefined residual braking criterion may be defined in an equivalent manner to how the at least one predefined temperature discrepancy criterion is defined.

Unlike with temperature, accurate instantaneous measurements of the torque being reacted at a given time are possible. Therefore, in some examples the controller 10 may periodically or continuously detect residual braking during a braking event, or during a flight cycle. For example, the controller 10 may periodically detect residual braking by calculating a torque difference in respect of multiple time points during a braking event, or during a flight cycle. In some examples the controller may continuously update a calculated torque difference value in real-time, or near real-time. In some such examples the received braking demand information comprises information relating to braking intensity currently being requested for a braking event; the received torque information comprises information relating to a torque currently being reacted by the at least one brake; and the received wheel speed information comprises information relating to a current wheel speed of the at least one brake, where "current" refers to the acquisition time of the most recent measured values available to the controller. It is expected that typically any delay between the acquisition time of a given set of measurements and the time at which the controller calculates an expected torque value using those measurements will be negligible. The controller 10 may therefore be configured to detect residual braking in real-time.

In other examples, the controller 10 is configured to detect residual braking in response to a determination that a significant torque-related discrepancy exists.

Figure 3:
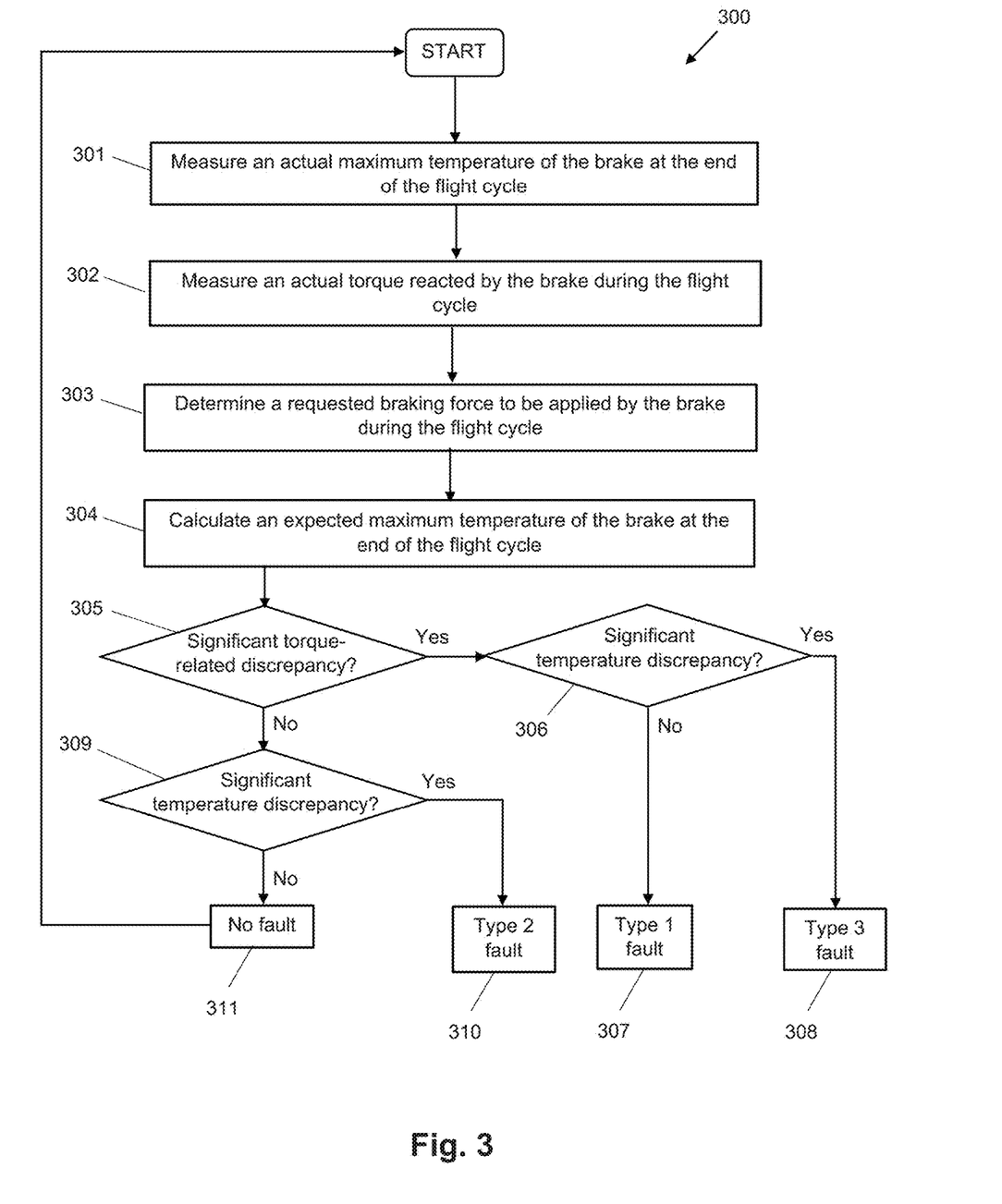
FIG. 3 is a flow chart illustrating an example method for detecting and diagnosing faults with an aircraft braking system.

FIG. 3 is a flow chart illustrating an example method 300 for detecting and diagnosing faults with an aircraft braking system comprising a brake. The method 300 can be performed by the example fault detection system 1 described above. In some examples the method 300 is performed by the controller 10 of the example fault detection system 1 during operation of the fault detection system 1.

In block 301 an actual temperature of the brake is measured, at the end of a flight cycle. The actual temperature of the brake may be measured in any of the ways described above in relation to the operation of the example fault detection system 1. In particular, the actual temperature may be a maximum temperature reached by the brake during the flight cycle. In block 302 an actual torque reacted by the brake during the flight cycle is measured. The actual torque may be measured in any of the ways described above in relation to the operation of the example fault detection system 1. For example, the actual torque may be measured continuously during the flight cycle, or at one or more discrete time points during the flight cycle. The actual torque measured may be the cumulative torque reacted by the brake during the complete flight cycle. Block 302 may be performed before, simultaneously with, or overlapping with block 301.

In block 303 a requested braking force to be applied by the brake during the flight cycle is determined. The requested braking force may have any of the features of the demanded braking force described above in relation to the nature of the braking demand information. The requested braking force may be determined in any of the ways described above in relation to the operation of the example fault detection system 1. The requested braking force may be determined continuously during the flight cycle, or at one or more discrete time points during the flight cycle. Block 303 may be performed before, simultaneously with, or overlapping with block 301 and/or block 302.

In block 304 an expected temperature of the brake at the end of the flight cycle is calculated, based on a measured wear state of the brake during the flight cycle, measured wheel speed of a wheel associated with the brake during the flight cycle, and the actual torque reacted by the brake during the flight cycle. The wear state and wheel speed may be measured and made available to an entity or component performing block 304 in any of the ways described above in relation to the operation of the example fault detection system 1. The expected temperature of the brake may be calculated in any of the ways described above in relation to the operation of the example fault detection system 1. In particular, the expected temperature may be an expected maximum temperature reached by the brake during the flight cycle. Block 304 is performed at or after the end of the flight cycle.

In block 305, it is determined whether a significant torque-related discrepancy exists, based on the actual torque and the requested braking force. Determining whether a significant torque-related discrepancy exists may be performed in any of the ways described above in relation to the operation of the example fault detection system 1. In particular, determining whether a significant torque-related discrepancy exists may involve calculating a brake gain. Block 305 may be performed continuously during the flight cycle, at one or more discrete time points during the flight cycle, or at or after the end of the flight cycle.

If it is determined in block 305 that a significant torque-related discrepancy exists, then in block 306 it is determined whether a significant temperature discrepancy between the expected temperature and the actual temperature exists in addition to the existence of a significant torque-related discrepancy. Determining whether a significant temperature discrepancy exists may be performed in any of the ways described above in relation to the operation of the example fault detection system 1.

If it is determined in block 306 that no significant temperature discrepancy between the expected temperature and the actual temperature exists, in addition to a significant torque-related discrepancy existing, then in block 307 the existence of a first type of fault is predicted. Predicting the existence of a first type of fault may comprise generating an alert, such as the first alert described above in relation to the operation of the example fault detection system 1. The first type of fault may have any of the features of the first fault type described above in relation to the operation of the example fault detection system 1.

If it is determined in block 306 that a significant temperature discrepancy between the expected temperature and the actual temperature exists, in addition to a significant torque-related discrepancy existing, then in block 308 the existence of a third type of fault is predicted. Predicting the existence of a third type of fault may comprise generating an alert, such as the third alert described above in relation to the operation of the example fault detection system 1. The third type of fault may have any of the features of the third fault type described above in relation to the operation of the example fault detection system 1.

Returning to block 305, if it is determined in block 305 that no significant torque-related discrepancy exists, then in block 309 it is determined whether a significant temperature discrepancy between the expected temperature and the actual temperature exists. Determining whether a significant temperature discrepancy exists may be performed in any of the ways described above in relation to the operation of the example fault detection system 1.

If it is determined in block 309 that a significant temperature discrepancy between the expected temperature and the actual temperature exists, in addition to no significant torque-related discrepancy existing, then in block 310 the existence of a second type of fault is predicted. Predicting the existence of a second type of fault may comprise generating an alert, such as the second alert described above in relation to the operation of the example fault detection system 1. The second type of fault may have any of the features of the second fault type described above in relation to the operation of the example fault detection system 1.

If it is determined in block 309 that no significant temperature discrepancy between the expected temperature and the actual temperature exists, in addition to no significant torque-related discrepancy existing, then in block 311 it is deemed that no fault exists with the braking system (in other words, the existence of a fault is not predicted). The method 300 is then repeated, to continue monitoring for faults.

The method 300 may be performed continuously during a flight cycle of an aircraft. Alternatively, the method 300 may be performed periodically during a flight cycle, or may be performed once in respect of a flight cycle, at or after the end of that flight cycle. Where the method 300 is performed continuously, one or more of blocks 305-311 of a first iteration of the method may be performed simultaneously with one of more of blocks 301-304 of a subsequent iteration of the method. One or more of the blocks, or the process steps represented thereby, need not be performed in the particular order shown by FIG. 3. For example, the existence of a significant temperature discrepancy may be determined in block 305, and the existence of a significant torque-relate discrepancy may be determined in blocks 306 and 309.

At any point during the method 300, an optional process of detecting residual braking may be performed. Detecting residual braking may be performed, for example, in the manner described above in relation to the operation of the example fault detection system 1. In some examples detecting residual braking may be performed in response to a significant-torque related discrepancy having been determined in block 305. In other examples detecting residual braking may be performed periodically or continuously, in parallel with the method 300.

Figure 4:
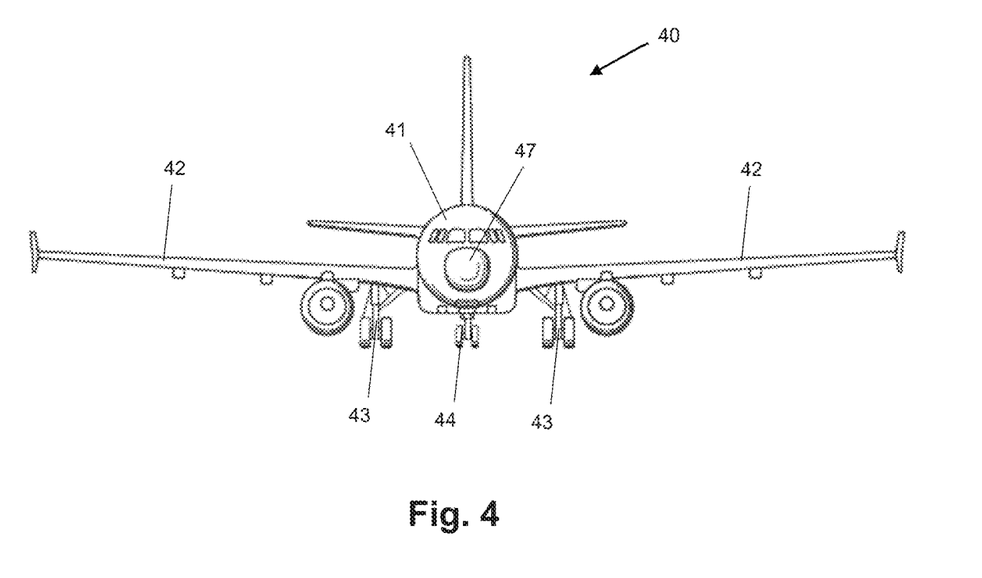
FIG. 4 is a schematic view of an example aircraft comprising a fault detection system according to an example.

FIG. 4 shows an aircraft 40 on which a fault detection system according to the examples (e.g. the fault detection system 1) is installed. The aircraft 40 comprises a fuselage 41, wings 42, and main 43 and nose 44 landing gear. Two wheels are attached to each landing gear 43, 44. Each wheel has an associated brake (not visible) for braking that wheel. Each brake has an associated set of sensors. Each set of sensors comprises torque sensor for measuring the torque reacted by the associated brake during a braking event, wear sensor for measuring a wear state of the associated brake, temperature sensor for measuring the temperature of the associated brake, and wheel speed sensor for measuring a wheel speed of a wheel braked by the associated brake. The aircraft 40 has four brakes (two on each main landing gear 43, none on the nose landing gear 44) and therefore comprises four separate sensor sets. In some examples, not all of the data generated by the four sensor sets is used. For example, it may be known by the fault detection system that there is an existing issue with one of the brakes or its associated wheel (such as a non-operational brake, a tyre pressure issue, or the like. In this case, the fault detection system may be configured to ignore data received in respect of that brake/wheel, at least during a period in which the known issue is present.

The aircraft 40 further comprises an avionics system 47, and in the particular example the fault detection system is comprised in the avionics system 47. The avionics system 47 is located in an avionics bay or compartment. In the particular example the avionics bay is in the nose of the aircraft below the cockpit, but it may be in a different location depending on the type of aircraft. The avionics system 47 comprises the electronic systems associated with flying the aircraft, including airborne communication and navigation systems and flight control systems. The avionics system 47 may comprise all of the electronics associated with communicating information to other parts of the aircraft 40. The avionics system 47 may also provide inputs to the fault detections system, such as the braking demand information, and/or information about existing operational or maintenance issues.

The fault detection system may be configured to separately generate and process signals relating to each individual set of sensors from which it receives measurements (that is, relating to each individual brake of the aircraft). However, alternative examples are possible in which at least some of the data processing for the different brakes is combined by the fault detection system. In particular, in some examples a controller of the fault detection system is configured to receive braking demand information, torque information and wheel speed information for each brake of the aircraft 40, and is to determine whether a significant torque-related discrepancy exists by combining the torque information, the wheel speed information and the braking demand information for all of the brakes. In some such examples, an expected total torque for the aircraft may be calculated, and the controller may determine whether a significant discrepancy exists between the calculated expected total torque and a total torque actually reacted by the aircraft (which may be determined, for example, by summing the torques reacted by each of the brakes). In such examples the total expected torque should be substantially equal to the total torque actually reacted, if the braking system of the aircraft is operating correctly.

Various alternative arrangements are possible for the fault detection system. For example, more than one fault detection system may be provided, e.g. a fault detection system may be provided for each individual brake comprised in the aircraft 40, or there may be a fault detection system for each landing gear of the aircraft 40.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A fault detection system to detect faults relating to an aircraft braking system comprising at least one brake, the fault detection system comprising a controller configured to:
receive braking demand information relating to a requested braking intensity for a braking event;
receive torque information relating to an amount of torque reacted by the at least one brake during the braking event;
receive wear information relating to a wear state of the at least one brake during the braking event;
receive wheel speed information relating to a wheel speed of a wheel associated with the at least one brake during the braking event;
receive brake temperature information relating to a maximum temperature of the at least one brake as a result of the braking event;
calculate an expected maximum temperature of the brake as a result of the braking event, based on the received torque information, the received wear information and the received wheel speed information;
determine whether a temperature discrepancy exists between the calculated expected maximum temperature and the received brake temperature information;
determine whether a torque-related discrepancy exists based on the received braking demand information and the received torque information;
if the torque-related discrepancy exists and the temperature discrepancy does not exist, generate a first alert relating to a first fault type;
if the temperature discrepancy exists and the torque-related discrepancy does not exist, generate a second alert relating to a second fault type; and
if the temperature discrepancy exists and the torque-related discrepancy exists, generate a third alert relating to a third fault type.

2. The fault detection system according to claim 1, wherein the first fault type comprises physical faults relating to braking-related components of the braking system, the second fault type comprises monitoring faults relating to monitoring-related components of the braking system, and the third fault type comprises faults relating to a torque sensor which generates the received torque information.

3. The fault detection system according to claim 2, wherein:
the first fault type comprises one or more of: residual braking, a ruptured brake disc and, a hydraulic failure; and
the second fault type comprises one or more of: failure of one or more sensors, incorrect operation of one or more sensors, and inaccurate readings generated by one or more sensors.

4. The fault detection system according to claim 1, wherein the controller is configured to determine whether the temperature discrepancy exists by determining whether the received temperature information meets at least one predefined temperature discrepancy criterion comprising a predefined primary temperature difference threshold by calculating a temperature difference between the received temperature information and the expected temperature and determining whether the calculated difference exceeds the predefined primary temperature difference threshold.

5. The fault detection system according to claim 4, wherein the controller is configured to calculate a temperature difference in respect of each flight cycle of the aircraft, wherein the at least one predefined temperature discrepancy criterion comprises a predefined second temperature difference threshold and a predefined number N of consecutive flight cycles, and wherein the controller is configured to determine whether the temperature discrepancy exists by determining whether each of the N most recent calculated temperature difference values exceeds the predefined second temperature difference threshold.

6. The fault detection system according to claim 4, wherein the at least one predefined temperature discrepancy criterion is defined based on calibration data for the at least one brake.

7. The fault detection system according to claim 4, wherein the controller is configured to update the at least one predefined temperature discrepancy criterion based on historical received braking demand information, torque information, wear information, wheel speed information, and/or brake temperature information relating to the at least one brake.

8. The fault detection system according to claim 1, wherein the controller is configured to determine whether the torque-related discrepancy exists by calculating a brake gain based on the received torque information, the received braking demand information and the received wheel speed information, and determining whether the calculated brake gain meets at least one predetermined brake gain discrepancy criterion.

9. The fault detection system according to claim 8, wherein the at least one predefined brake gain discrepancy criterion comprises a predefined upper primary brake gain threshold and a predefined lower primary brake gain threshold, and wherein the controller is configured to determine whether a brake gain discrepancy exists by determining whether the calculated brake gain is between the upper primary brake gain threshold and the lower primary brake gain threshold.

10. The fault detection system according to claim 8, wherein the controller is configured to calculate a brake gain in respect of each flight cycle of the aircraft, wherein the at least one predefined brake gain discrepancy criterion comprises a predefined upper secondary brake gain threshold, a predefined lower secondary brake gain threshold, and a predefined number L of consecutive flight cycles, and wherein the controller is configured to determine whether the torque-related discrepancy exists by determining whether each of the L most recent calculated brake gain values is between the upper secondary brake gain threshold and the lower secondary brake gain threshold.

11. The fault detection system according to claim 8, wherein:
the received torque information relates to a torque reacted by the at least one brake over a complete flight cycle;
the received braking demand information relates to requested braking intensity over the complete flight cycle; and
the calculated brake gain is an average brake gain for the complete flight cycle.

12. The fault detection system according to claim 8, wherein the at least one predefined brake gain discrepancy criterion is defined based on calibration data for the at least one brake.

13. The fault detection system according to claim 8, wherein the controller is configured to update the at least one predefined brake gain discrepancy criterion based on historical received braking demand information, torque information and/or, wheel speed information relating to the at least one brake.

14. The fault detection system according to claim 1, wherein the controller is further configured to detect residual braking by:
calculating an expected torque expected to be reacted by the brake during the braking event based on the received braking demand information,
determining an actual torque reacted by the brake during the braking event based on the received torque information; and
determining whether the determined actual torque is higher than the calculated expected torque.

15. The fault detection system according to claim 14, wherein:
the received braking demand information comprises information relating to braking intensity currently being requested for a braking event;
the received torque information comprises information relating to a torque currently being reacted by the at least one brake; and
the received wheel speed information comprises information relating to a current wheel speed of the at least one brake;

wherein the controller is configured to continuously detect residual braking by calculating in real-time a current expected torque expected to be being currently reacted by the brake;
determining in real-time a current actual torque reacted by the brake during the braking event, and determining in real-time whether the determined current actual torque is higher than the calculated current expected torque.

16. The fault detection system according to claim 14, wherein the controller is configured to detect residual braking in response to a determination that a torque-related discrepancy exists.

17. The fault detection system according to claim 1, wherein the controller is configured to determine the expected brake temperature by:
determining an amount of energy input to the brake during the braking event, based on the received torque information and the received wheel speed information; and
determining a thermal mass of a component of the brake, based on the received wear information.

18. The fault detection system according to claim 1, wherein:
the received temperature information relates to a temperature of the at least one brake at the end of a particular flight cycle;
the controller is configured to calculate an expected temperature of the at least one brake at the end of the particular flight cycle; and
the controller is configured to determine whether a discrepancy exists between the calculated expected temperature and the received temperature information in respect of the particular flight cycle.

19. The fault detection system according to claim 1, wherein the first alert comprises a warning message indicating a fault of the first type, the second alert comprises a warning message indicating a fault of the second type, and the third alert comprises a warning message indicating a fault of the third type.

20. An aircraft including the fault detection system of claim 1 and further comprising:
a torque sensor configured to measure the torque reacted by a brake during a braking event;
a wear sensor configured to measure a wear state of the brake;
a temperature sensor configured to measure a temperature of the brake; and
a wheel speed sensor configured to measure a wheel speed of a wheel braked by the brake.

21. A method for detecting and diagnosing faults with an aircraft braking system comprising a brake, the method comprising:
measuring an actual maximum temperature of the brake at the end of a flight cycle;
measuring an actual torque reacted by the brake during the flight cycle;
determining a requested braking force to be applied by the brake during the flight cycle;
calculating an expected maximum temperature of the brake at the end of the flight cycle, based on a measured wear state of the brake during the flight cycle, measured wheel speed of a wheel associated with the brake during the flight cycle, and the actual torque reacted by the brake during the flight cycle;
determining whether a torque-related discrepancy exists based on the actual torque and the requested braking force;

determining whether a temperature discrepancy exists between the expected maximum temperature and the actual maximum temperature;

if the significant torque-related discrepancy exists and the temperature discrepancy does not exist, predicting the existence of a first type of fault;

if the temperature discrepancy exists and the torque-related discrepancy does not exist, predicting the existence of a second type of fault; and if the temperature discrepancy exists and the torque-related discrepancy does not exist, predicting the existence of a third type of fault.

* * * * *